(12) United States Patent
Miura

(10) Patent No.: US 11,648,960 B2
(45) Date of Patent: May 16, 2023

(54) CONTROL METHOD AND CONTROL DEVICE FOR CONTROLLING AUTONOMOUSLY DRIVEN VEHICLE

(71) Applicant: Nissan Motor Co., Ltd., Yokohama (JP)

(72) Inventor: Hajime Miura, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 16/958,166

(22) PCT Filed: Jan. 25, 2018

(86) PCT No.: PCT/JP2018/002338
§ 371 (c)(1),
(2) Date: Jun. 26, 2020

(87) PCT Pub. No.: WO2019/146052
PCT Pub. Date: Aug. 1, 2019

(65) Prior Publication Data
US 2020/0361488 A1    Nov. 19, 2020

(51) Int. Cl.
*B60W 60/00* (2020.01)
*B60W 30/18* (2012.01)
(Continued)

(52) U.S. Cl.
CPC .... *B60W 60/0015* (2020.02); *B60W 30/0956* (2013.01); *B60W 30/18159* (2020.02);
(Continued)

(58) Field of Classification Search
CPC ....... B60W 30/18159; B60W 60/0015; B60W 30/0956; B60W 2554/60; G08G 1/166
See application file for complete search history.

(56) References Cited

U.S. PATENT DOCUMENTS

2002/0036584 A1* 3/2002 Jocoy ................ G01S 13/931
342/72
2016/0035223 A1* 2/2016 Gutmann ........ B60W 30/18154
340/907

(Continued)

FOREIGN PATENT DOCUMENTS

JP    2005-165643 A    6/2005
JP    2005165643 A *    6/2005

(Continued)

*Primary Examiner* — Khoi H Tran
*Assistant Examiner* — Tristan J Greiner
(74) *Attorney, Agent, or Firm* — Global IP Counselors, LLP

(57) ABSTRACT

A control method and a control device are provided for autonomously controlling a host vehicle when turning across an oncoming lane at an intersection with a signal light being green. A determination is made as to whether or not the host vehicle can make a right or left turn while a signal light is still green at a time of the right or left turn, either while the host vehicle in the left lane is waiting in a row of vehicles to make the right turn or while the host vehicle traveling in the right lane is waiting in a row of vehicles to make the left turn at an intersection during travel under autonomous driving. The host vehicle then creeps forward to a start position for starting at a next time the signal light is green upon determining the right or left turn cannot be made.

9 Claims, 7 Drawing Sheets

(51) Int. Cl.
*B60W 30/095* (2012.01)
*G08G 1/16* (2006.01)
*G08G 1/00* (2006.01)

(52) U.S. Cl.
CPC ............... *G08G 1/166* (2013.01); *G08G 1/20* (2013.01); *B60W 2555/60* (2020.02)

(56) References Cited

U.S. PATENT DOCUMENTS

| | | | |
|---|---|---|---|
| 2016/0368492 A1* | 12/2016 | Al-Stouhi | B60W 30/09 |
| 2017/0072943 A1* | 3/2017 | Pedlar | B60K 6/36 |
| 2017/0160745 A1* | 6/2017 | Lauffer | G01S 13/931 |
| 2018/0126995 A1* | 5/2018 | Caballero De Ita | B60W 10/20 |
| 2020/0026284 A1* | 1/2020 | Hiramatsu | G01C 21/36 |

FOREIGN PATENT DOCUMENTS

| | | | | |
|---|---|---|---|---|
| JP | 2007-219743 | A | | 8/2007 |
| JP | 2009-25902 | A | | 2/2009 |
| JP | 2009025902 | A | * | 2/2009 |
| JP | 2016-100028 | A | | 5/2016 |
| JP | 2017-58774 | A | | 3/2017 |
| JP | 2017058774 | A | * | 3/2017 |
| JP | 2017-146872 | A | | 8/2017 |
| WO | 2016/063385 | A1 | | 4/2016 |
| WO | WO-2016063385 | A1 | * | 4/2016 ............ G01C 21/34 |
| WO | 2017/013750 | A1 | | 1/2017 |

\* cited by examiner

CONTROL METHOD AND CONTROL DEVICE FOR CONTROLLING AUTONOMOUSLY DRIVEN VEHICLE

CROSS-REFERENCE TO RELATED APPLICATIONS

This application is a U.S. national stage application of International Application No. PCT/JP2018/002338, filed on Jan. 25, 2018.

TECHNICAL FIELD

The present invention relates to a method and a device for controlling an autonomously driven vehicle, and particularly relates to a technique in which a right turn is made at an intersection under autonomous driving.

BACKGROUND INFORMATION

In Japanese Laid Open Application No. 2007-219743 A, the presence of an intersection is not presumed, but the following is disclosed as a technique that can be applied when passing through a traffic signal under autonomous driving. When a host vehicle is approaching a traffic signal ahead, a color of the traffic signal is recognized based on image information, etc., of an onboard camera. If the traffic signal is green, a current traveling state via autonomous driving is maintained to pass through the traffic signal or a preceding vehicle ahead of the host vehicle is followed to pass through the traffic signal (paragraphs 0033 and 0034).

SUMMARY

However, during right turns at intersections, the following situation poses a problem in cases in which, according to the technique disclosed in the abovementioned document, the current traveling state is maintained or the preceding vehicle is followed on the condition only that the traffic signal is green. In cases in which, before the host vehicle advances into the intersection, the color of the traffic signal changes from a color (e.g., green) indicating advancing is allowed to a color (e.g., yellow or red) indicating caution must be taken or advancing is prohibited, the host vehicle must decelerate in order to avoid advancing into the intersection, and fuel needed to travel until the signal color change is recognized is wastefully consumed.

An object of the present invention is to provide a method and device for controlling an autonomously driven vehicle in which the problem described above is taken into consideration.

The invention according to one aspect provides a method for controlling an autonomously driven vehicle, comprising: determining whether or not the host vehicle can make a right turn while a signal light is still green at a time of the right turn is to be made at an intersection under autonomous driving; causing the host vehicle to approach the intersection with a first driving force and executing the right turn upon determining the right turn can be made; and causing the host vehicle to move forward with a second driving force, which is lower than the first driving force, to a start position for starting at a next time the signal light is green upon determining the right turn cannot be made.

The invention according to another aspect provides a device for controlling the autonomously driven vehicle.

DETAILED DESCRIPTION OF EMBODIMENTS

An embodiment of the present invention is described below with reference to the drawings.

Figure 1:
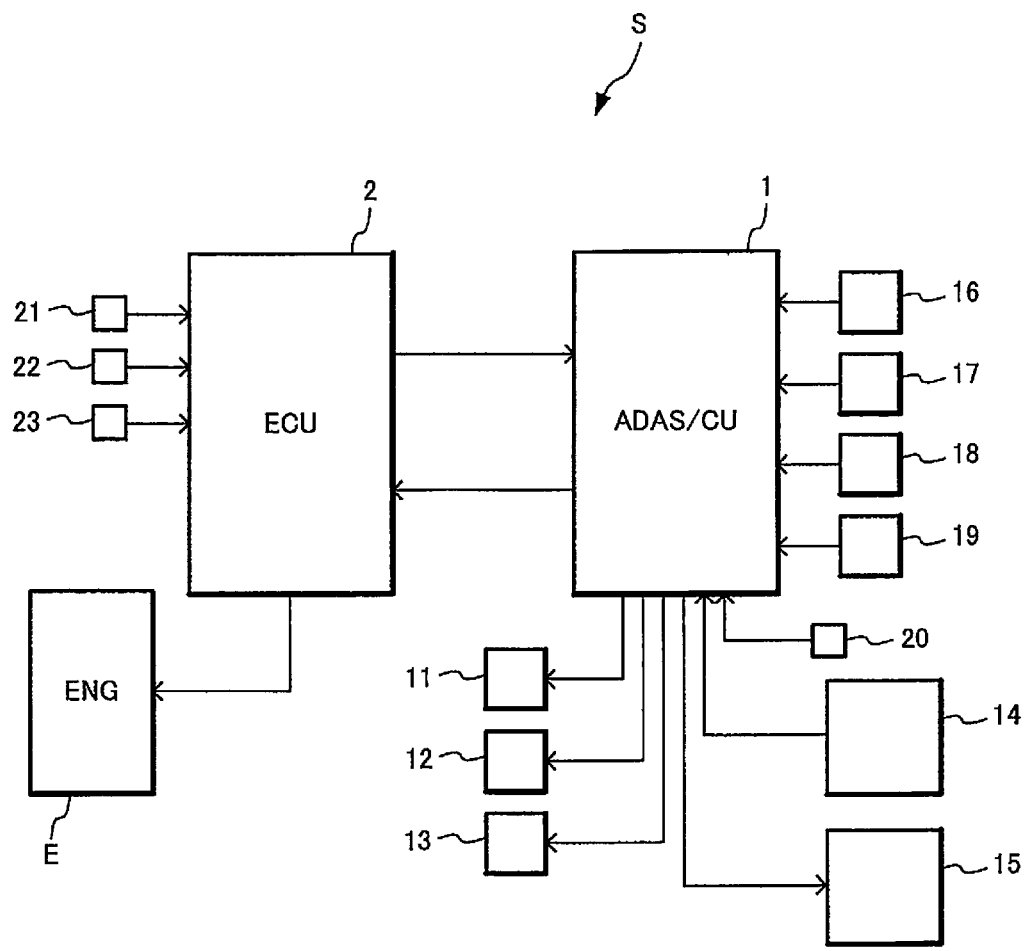
FIG. 1 is a schematic diagram of an overall configuration of a control system for an autonomously driven vehicle according to one embodiment of the present invention.

FIG. 1 schematically depicts an overall configuration of a control system S (referred to below as a "vehicle control system") for an autonomously driven vehicle according to one embodiment of the present invention.

The vehicle control system S comprises an internal combustion engine (referred to below simply as an "engine") E which is a drive source for a vehicle, a driving assist system controller (ADAS/CU) 1, and an engine controller (ECU) 2.

The engine controller 2 controls actions of the engine E, and controls output of the engine E by adjusting an amount of intake air taken into the engine E, an amount of fuel supplied to the engine E, etc. The engine controller 2 is communicably connected to the driving assist system controller 1, and the engine controller inputs, as information pertaining to engine control, a signal from an acceleration sensor 21 that detects accelerator pedal depression by a driver, a signal from a speed sensor 22 that detects a speed of the engine E, a signal from a water temperature sensor 23 that detects a temperature of cooling water for the engine E, etc.

The driving assist system controller 1 sets various control parameters pertaining to autonomous driving of the vehicle and outputs command signals corresponding to the control parameters to various devices (e.g., the engine E and an automatic transmission (not shown)) associated with autonomous driving. In the present embodiment, the term "autonomous driving" refers to a driving state in which, based on observations made by the driver, it is possible at any time for the driver to return to manual driving as the driver chooses, and the operations of acceleration, braking, and steering are all the function of the control system. This driving state is not provided by way of limitation as to classifications of automatization or levels of autonomous driving to which the present embodiment can be applied. In the present embodiment, vehicle speed is basically controlled under autonomous driving so as to approach a target vehicle speed set by the driver or established by law, etc. Vehicle acceleration or deceleration set when the vehicle speed is controlled is equivalent to a control parameter pertaining to autonomous driving.

In addition to the engine E, the vehicle control system S comprises, as devices associated with autonomous driving of the vehicle, an autonomous steering device 11, an autonomous wheel brake device 12, and an autonomous parking brake device 13. The autonomous steering device 11, the autonomous wheel brake device 12, and the autonomous parking brake device 13 can each be activated in accordance with a command signal from the driving assist system controller 1. The autonomous steering device 11 is a device for changing an advancing direction and reversing direction of the vehicle during autonomous driving, the autonomous wheel brake device 12 is a device for causing braking force to be generated in the vehicle regardless of operation of a brake pedal by the driver, and the autonomous parking brake device 13 is a device for autonomously actuating a parking brake when a system starter switch of the vehicle is in an off state.

Furthermore, the vehicle control system S comprises a switch device 14 for switching between autonomous driving and manual driving as the driver chooses and setting a travel condition during autonomous driving, and a display device 15 for informing the driver of the actuated state of autonomous driving and the travel state of the vehicle. In the present embodiment, the switch device 14 is configured as a collective switch (referred to below as a "handle switch") provided adjacent to a gripped part of a steering wheel, and is provided with an operation part for switching autonomously between on and off and also switching a set vehicle speed and a set vehicle-to-vehicle distance. The display device (referred to below as a "meter display") 15 is installed in a dashboard of a driver's seat, configured such that the on or off state of autonomous driving can be visually recognized (for example, by using different display colors for the on state and the off state of autonomous driving), and provided with a display section that displays the set vehicle speed and the set vehicle-to-vehicle distance. The display device 15 can also be realized in the form of a head-up display.

In the present embodiment, the driving assist system controller 1 and the engine controller 2 are configured as electronic control units that are each provided with a microcomputer composed of a central computation device (CPU), a ROM, RAM, and other various storage devices, an input/output interface, etc.

The driving assist system controller 1 inputs, as information pertaining to autonomous driving, not only a signal from the handle switch 14, but also a signal from a travel environment recognition device 16 and a traveling vehicle monitoring device 17.

The travel environment recognition device 16 is for recognizing the environment or surrounding situation where the host vehicle is located, and can be realized in the form of, for example, an optical camera sensor. The travel environment recognition device 16 may be composed of a plurality of optical camera sensors having different sensing distances or viewing angles.

The traveling vehicle monitoring device 17 is for monitoring a preceding vehicle in a range not more than a predetermined distance ahead of the host vehicle, and can be realized in the form of an optical camera sensor, as well as a radar sensor, e.g., a milli-wave radar sensor. The traveling vehicle monitoring device 17 outputs a signal corresponding to a vehicle-to-vehicle distance between the host vehicle and a preceding vehicle when there is a preceding vehicle, and based on the signal from the traveling vehicle monitoring device 17, the driving assist system controller 1 specifically detects a relative speed of the preceding vehicle, relative to the host vehicle, from a rate of change per unit time in the vehicle-to-vehicle distance.

The travel environment recognition device 16 and the traveling vehicle monitoring device 17 need not be discrete sensors and can also be configured as one sensor unit; these devices can be configured together from an optical camera sensor, a laser radar sensor (LiDAR), etc.

The driving assist system controller 1 further inputs signals from a road traffic information reception device 18 and a vehicle position detection device 19 as information pertaining to autonomous driving.

The road traffic information reception device 18 receives Vehicle Information and Communication System (®) (VICS) information and other road traffic information from a base station outside the vehicle; for example, this device can be realized in the form of a car navigation system. The road traffic information reception device 18 can be substituted by a VICS information receiver, or also by a vehicle-to-vehicle communication information receiver or a road-to-vehicle communication information receiver. A possible example of a road-to-vehicle communication information receiver is a receiver that communicates with a beacon or another wireless transmitter.

The vehicle position detection device 19 detects a position of the host vehicle (specifically, a position on a road map), and can be realized in the form of, for example, a positioning data receiver (referred to below as a "GPS receiver") of a global positioning system (GPS). GPS positioning data can be corrected by an inertial navigation unit using a gyro sensor, a vehicle speed sensor, etc., and accuracy of position detection can be improved.

In addition to the above, the driving assist system controller 1 inputs a signal from a vehicle speed sensor 20, which detects a vehicle speed VSP. A signal indicating the vehicle speed VSP can be inputted via the engine controller 2.

2. Actions of Control System

When autonomous driving is selected by operating the handle switch 14, the vehicle control system S sets a required acceleration and a required deceleration for the host vehicle based on the traveling state of the host vehicle, the traveling state of a vehicle (e.g., a preceding vehicle) other than the host vehicle, the surrounding traffic situation, etc. The driving assist system controller 1 sets a required driving force for the vehicle needed to achieve the required acceleration, and outputs to the engine controller 2 a command signal for causing an output torque corresponding to the required driving force to be generated by the engine E. The driving assist system controller 1 further sets a required braking force for the vehicle needed to achieve the required deceleration, and outputs a command signal corresponding to the required braking force to the autonomous wheel brake device 12.

In the present embodiment, the driving assist system controller 1 designates a maximum vehicle speed indicated by a road sign or established by law, etc., as a limit vehicle speed, selects whichever is the lower of the vehicle speed set by the driver (sometimes referred to below as the "set vehicle speed") and the limit vehicle speed, and sets this selected speed as a target vehicle speed. The required driving force is set and a command signal for the engine controller 2 is outputted so that the vehicle speed is made to approach the target vehicle speed at the required acceleration rate corresponding to the current speed of the host vehicle. The vehicle thereby basically performs steady-speed travel at the target vehicle speed during autonomous driving.

Furthermore, when following travel is performed in which a predetermined vehicle-to-vehicle distance is maintained with a preceding vehicle ahead of the host vehicle, the driving assist system controller 1 sets the required driving force and the required braking force so that the relative speed of the preceding vehicle in relation to the host vehicle (in other words, the relative speed of the host vehicle in relation to the preceding vehicle) is 0 at the vehicle-to-vehicle distance set in advance or set by the driver (sometimes referred to below as the "set vehicle-to-vehicle distance").

Autonomous driving is canceled by the handle switch 14 being operated by the driver or by any operation associated with vehicle behavior being performed (e.g., the brake pedal being pressed).

The description below presents a case in which a host vehicle travels under autonomous driving along a travel route (referred to below as a "set route") from a current location to a destination set in the car navigation system 18.

Figure 2:
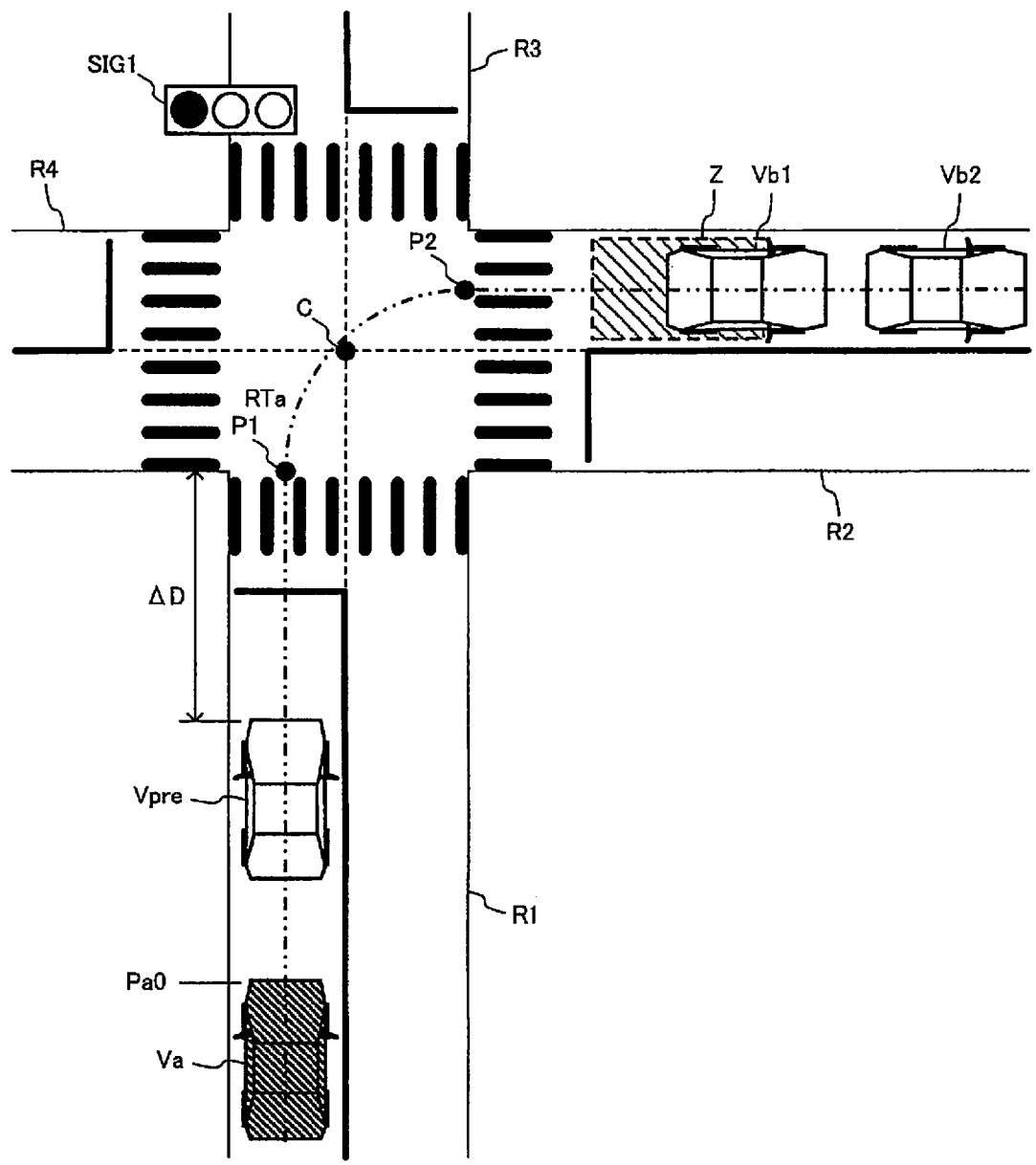
FIG. 2 is an explanatory drawing of one example of an action the autonomously driven vehicle is made by right-turn control to perform (at the start of control), according to the same embodiment.

FIG. 2 shows an intersection (a crossroad in the present embodiment) present in a set route, and shows that a host vehicle Va travels toward the intersection on a left lane of a road R1 extending down from the intersection in the drawing, while other vehicles Vb1, Vb2 travel in a direction away from the intersection on a left lane (referred to below as a "post right-turn lane") of a road R2 the host vehicle Va would reach after making a right turn. The example shown in FIG. 2 is not provided by way of limitation, but in this example, one preceding vehicle VPre is present in front of the host vehicle Va, and a plurality (e.g., two) of other vehicles Vb1, Vb2 are present in the post right-turn lane. In the illustrated situation, the driver of the host vehicle Va intends to turn right at the intersection and a right directional indicator is blinking.

In the present embodiment, based on such a situation, when a traffic signal SIG1 ahead of the host vehicle Va is green, a determination is made as to whether or not the host vehicle Va can make a right turn through the intersection during the current green signal light. When a right turn can be made, the host vehicle Va is made to approach the intersection by a comparatively high first driving force and a right turn is executed, and when a right turn cannot be made, the right turn at the current green signal light is deferred and control is executed in which the host vehicle Va is caused with a second driving force, which is lower than the first driving force, to move forward up to a start position at the next green light.

For the sake of convenience in the description, it is assumed that no other vehicles are present in either a road R3 extending up from the intersection point in the drawing or a road R4 extending to the left, but this does not intend to exclude from applicable scenarios of the present embodiment cases in which other vehicles affecting the travel of the host vehicle Va are present in either one or both of these roads R3, R4. For example, when there is an oncoming lane opposing the lane in which the host vehicle Va is traveling, or in other words an oncoming lane leading into the intersection on a left lane of the road R3, the determination of whether or not the host vehicle Va can turn right across oncoming traffic may include considering a possibility of coming into contact with this oncoming lane.

Description According to Flowchart

In the present embodiment, the determination of whether or not the host vehicle Va can make a right turn is performed according to a standard that differs depending on which position the host vehicle Va is in before the intersection or in a row of vehicles waiting to make a right turn. The following items are given as examples of determination standards for whether or not a right turn can be made, according to the present embodiment: (1) the behavior of other vehicles ahead of the host vehicle; (2) number of other vehicles present between the host vehicle and the intersection; (3) time during which the current signal will remain green; (4) distance from the intersection to the host vehicle; (5) traffic situation of the post right-turn lane; and (6) whether or not space for the host vehicle to advance into the post right-turn lane is ensured.

Figure 3:
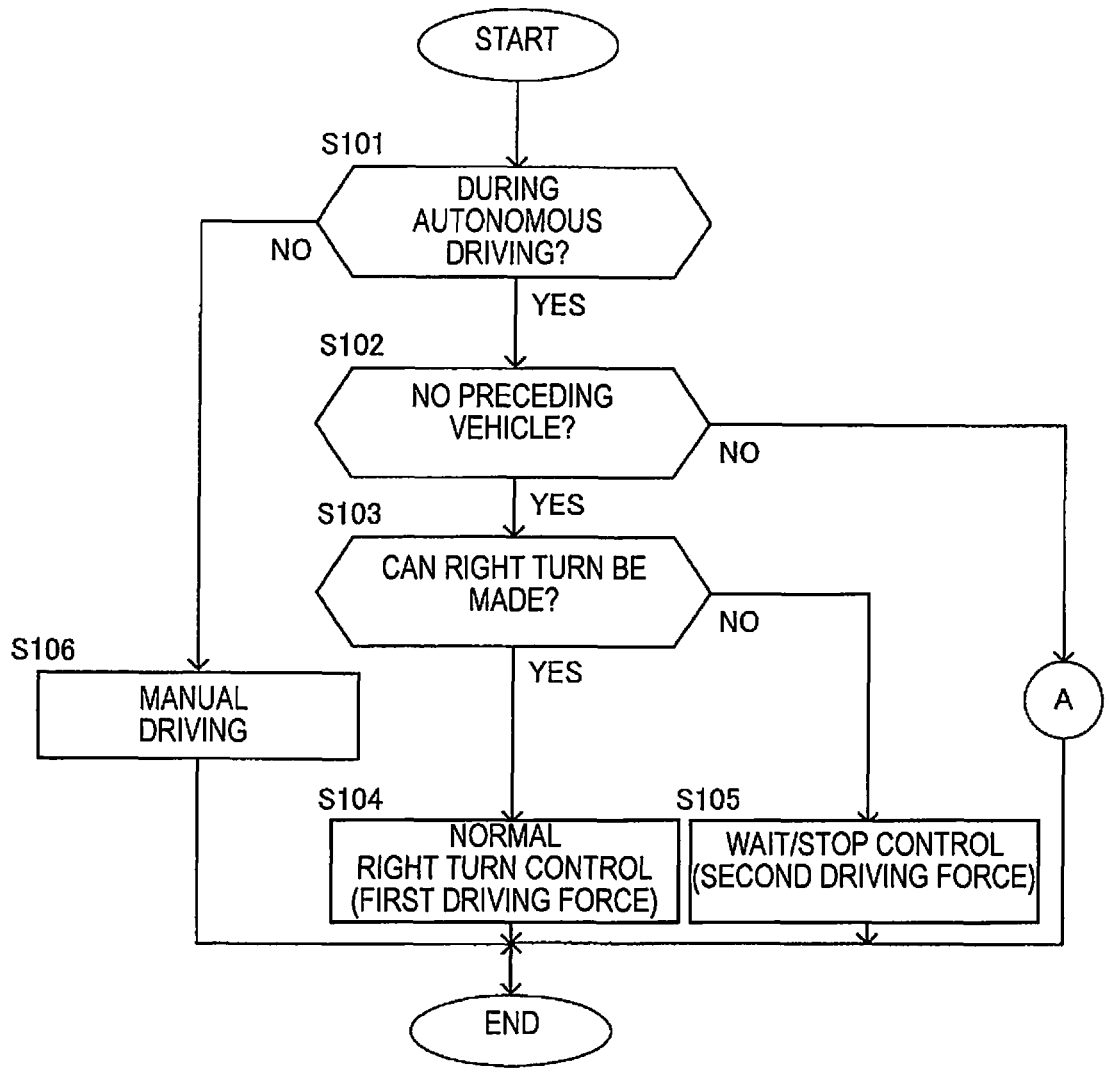
FIG. 3 is a flowchart of specifics of a process during a right turn made while the vehicle is at the head of a row of vehicles, in a right-turn control routine executed by the control system according to the same embodiment.
Figure 4:
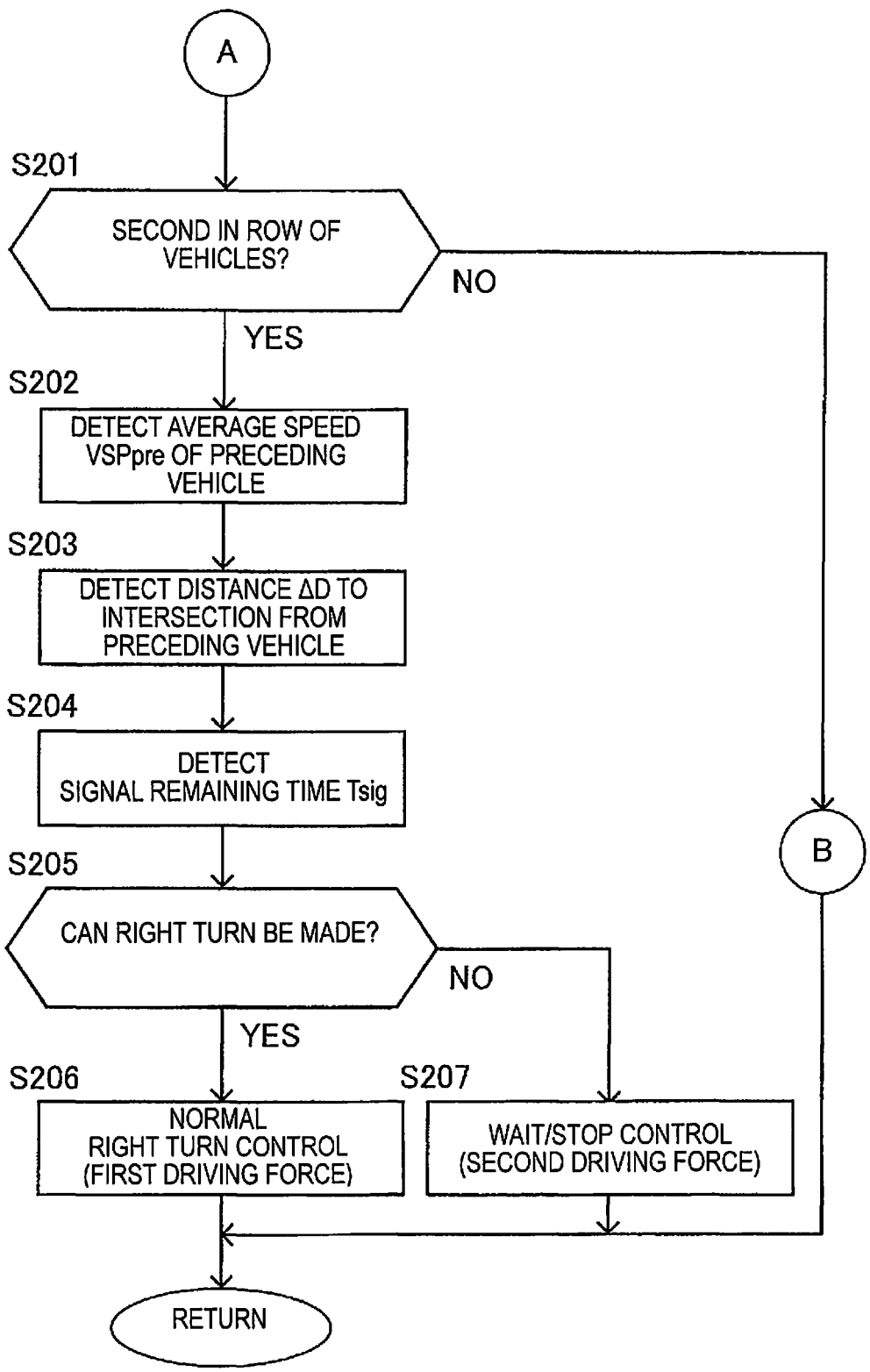
FIG. 4 is a flowchart of specifics of a process during a right turn made while the vehicle is second in a row of vehicles, in the right-turn control routine according to the same embodiment.

FIG. 3 uses a flowchart to show the specifics of a process in a case in which, during control (a right-turn control routine) performed by the driving assist system controller 1 on autonomous driving according to the present embodiment, the host vehicle Va is at forefront of a row of vehicles. FIG. 4 uses a flowchart to show the specifics of a process in a case in which the host vehicle Va is the second of a row of vehicles during the right-turn control routine, and FIG. 5 uses a flowchart to show the specifics of a process in a case in which the host vehicle Va is no further ahead than the third in a row of vehicles. The driving assist system controller 1 is programmed so as execute the right-turn control routine by means of an interruption process. Right-turn control according to the present embodiment is described using the flowcharts shown in FIGS. 3 to 5, with reference made to FIG. 2 as appropriate. FIG. 2 uses a double-dotted line to show a travel path RTa of the host vehicle Va during a right turn through the intersection.

In the present embodiment, the driving assist system controller 1 starts the right-turn control routine when the host vehicle Va, while traveling along the set route, reaches a position Pa0 a predetermined distance before the intersection through which the vehicle will make a right turn (FIG. 2). Whether or not the host vehicle Va is in the position Pa0 a predetermined distance before the intersection can be determined by collating a road map information and the position of the host vehicle Va, and with the road map information and the position of the host vehicle Va having been collated, a marker associated with the intersection (e.g., the traffic signal SIG1) can also be recognized by the optical camera sensor 16.

In the flowchart shown in FIG. 3, whether or not the host vehicle is currently in autonomous driving is determined in S101. Whether or not the host vehicle is currently in autonomous driving can be determined based on a signal from the handle switch 14. When the host vehicle is currently in autonomous driving, the process advances to S102, and when the host vehicle is not currently in autonomous driving, the process advances to S106.

In S102, whether or not another vehicle (referred to below as the "preceding vehicle") Vpre is ahead of the host vehicle Va is recognized. Whether or not there is a preceding vehicle VPre can be assessed based on inter alia, image information obtained by the optical camera sensor 16. When there is no preceding vehicle VPre, the process advances to S103, and when there is a preceding vehicle VPre, the process transitions to the process of the flowchart shown in FIG. 4.

In S103, whether or not the host vehicle Va can make a right turn is determined. The determination that there is no preceding vehicle VPre and the host vehicle Va is at the head of a row of vehicles depends on an assessment, made based on the traffic situation of the post right-turn lane, of whether or not an advancement space Z (FIG. 2) for the host vehicle Va will be ensured in the post right-turn lane within a remaining time (sometimes referred to below as a "signal remaining time") in which the traffic signal SIG1 maintains a green signal light. FIG. 2 schematically depicts the advancement space Z as a section containing diagonal lines. Whether or not an advancement space Z is ensured is determined by the optical camera sensor 16 recognizing a congested traffic situation in the post right-turn lane, or by detecting the behavior of the other vehicles Vb1, Vb2 (e.g., average speed of the other vehicles Vb1, Vb2) in the post right-turn lane through vehicle-to-vehicle communication and assessing whether or not an advancement space Z for the host vehicle Va is formed behind the row of vehicles in the post right-turn lane within a signal remaining time Tsig. When an advancement space Z for the host vehicle Va is ensured and a right turn can be made, the process advances to S104, and in other cases, specifically, when either the traffic signal SIG1 will change to yellow or red before the host vehicle Va reaches the intersection or the traffic signal remains green before until the host vehicle Va reaches the intersection but a right turn cannot be made due to there being no advancement space Z for the host vehicle Va in the post right-turn lane, the process advances to S105. The signal remaining time Tsig can also be ascertained by storing changing times for the colors of the traffic signal SIG1 in advance, or through vehicle-to-vehicle communication.

In S104, a right turn is executed during the current green signal light. Specifically, the current (i.e., before control starts) travel state using autonomous driving is maintained, the host vehicle Va is caused to approach the intersection with a first driving force F1 corresponding to the target vehicle speed, and a right turn is executed.

In S105, a right turn at the current green signal light is deferred. Specifically, the host vehicle Va is caused to move forward to a start position at the next green signal light with a second driving force F2, which is lower than the first driving force F1. In the present embodiment, the second driving force F2 is a driving force corresponding to the accelerator pedal not being pressed, and the "start position at the next green light" when there is no preceding vehicle VPre is a position at a stop line in front of the intersection. After the vehicle has stopped, when the traffic signal SIG1 changes from red back to green, a determination is made as to whether or not the host vehicle Va can set off. When the host vehicle Va can set off due to an advancement space Z being ensured in the post right-turn lane, the host vehicle Va is caused to set off by an acceleration rate used at normal times and a right turn is executed, and when there is no advancement space Z and the host vehicle cannot set off, the host vehicle Va is caused to remain stopped at the position of the stop line and the vehicle waits until it is possible to set off.

In S106, manual operation by the driver is selected and the host vehicle Va is caused to travel by a driving force corresponding to the driver's accelerator operation.

In the flowchart shown in FIG. 4, in S201, a determination is made as to whether or not the host vehicle Va is in front of the intersection or is the second of a row of vehicle waiting to make a right turn. Whether or not the host vehicle Va is the second can be determined based on, inter alia, image information obtained by the optical camera sensor 16. When the host vehicle Va is the second, the process advances to S202, and when the host vehicle is not the second, or in other words when the host vehicle Va is no further ahead than the third in the row of vehicles, the process transitions to a process according to the flowchart shown in FIG. 5. What place the host vehicle Va has in the row of vehicles can be ascertained by vehicle-to-vehicle communication.

In S202, an average vehicle speed (i.e., a movement average vehicle speed) VSPpre of the preceding vehicle Vpre is detected.

In S203, a distance from the preceding vehicle VPre to the intersection, i.e., a distance ΔD from a front end of the preceding vehicle VPre to an advancement point P1 of the intersection is detected. The distance ΔD can be detected by acquiring positional information of the preceding vehicle VPre through vehicle-to-vehicle communication, or by calculating the position of the preceding vehicle VPre from the vehicle-to-vehicle distance between the host vehicle Va and the preceding vehicle VPre.

In S204, the remaining time (signal remaining time) Tsig during which the traffic signal SIG1 will maintain the current green signal light is assessed.

In S205, a determination is made as to whether or not the host vehicle Va is able to make a right turn. A determination of a case in which the host vehicle Va is the second in a row of vehicles is made by calculating a required time Δt needed for the preceding vehicle VPre to reach the intersection based on the distance ΔD from the preceding vehicle VPre to the intersection and the average vehicle speed VSPpre of the preceding vehicle VPre, and assessing, from a relationship between the required time Δt and the signal remaining time Tsig, whether or not sufficient time for the host vehicle Va to advance into the intersection will be ensured after the preceding vehicle VPre has reached the intersection and before the traffic signal SIG1 changes from yellow to red. When the time needed for the host vehicle Va to advance into the intersection is ensured and a right turn can be made, the process advances to S206, and when a right turn cannot be made, the process advances to S207.

In S206, a right turn is executed during the current green signal light. Specifically, either the current travel state via autonomous driving is maintained or the host vehicle Va is caused to approach the intersection with the first driving force F1 for traveling while following the preceding vehicle VPre, and a right turn is executed following the preceding vehicle VPre. The traffic situation in the post right-turn lane is confirmed during the approach to the intersection, and when it is determined that there is no advancement space Z for the host vehicle Va, the driving force may be lowered and the host vehicle may be decelerated in order to stop at the position of the stop line.

In S207, the right turn at the current green signal light is deferred. Specifically, the host vehicle Va is caused to move forward to a start position at the next green signal light with the second driving force F2, i.e., a driving force corresponding to the accelerator pedal not being pressed. The "start position at the next green signal light" when the host vehicle Va is the second in a row of vehicles is either the position of the stop line before the intersection or a position where a predetermined vehicle-to-vehicle distance is left behind the preceding vehicle VPre which has stopped at the position of the stop line. When the traffic signal SIG1 turns back to green, whether or not the host vehicle Va can make a right turn during the current green signal light is determined based on the traffic situation in the post right-turn lane, the behavior of the preceding vehicle VPre, etc. When a right turn can be made, the host vehicle Va is caused to approach the intersection with the first driving force F1 corresponding to the target vehicle speed for right turns and a right turn is executed, and when a right turn cannot be made, a right turn is again deferred and either the host vehicle Va is caused to remain stopped at the position of the stop line or the host vehicle Va is caused to creep forward to the position of the stop line that is the start position of the next green signal light.

Figure 5:
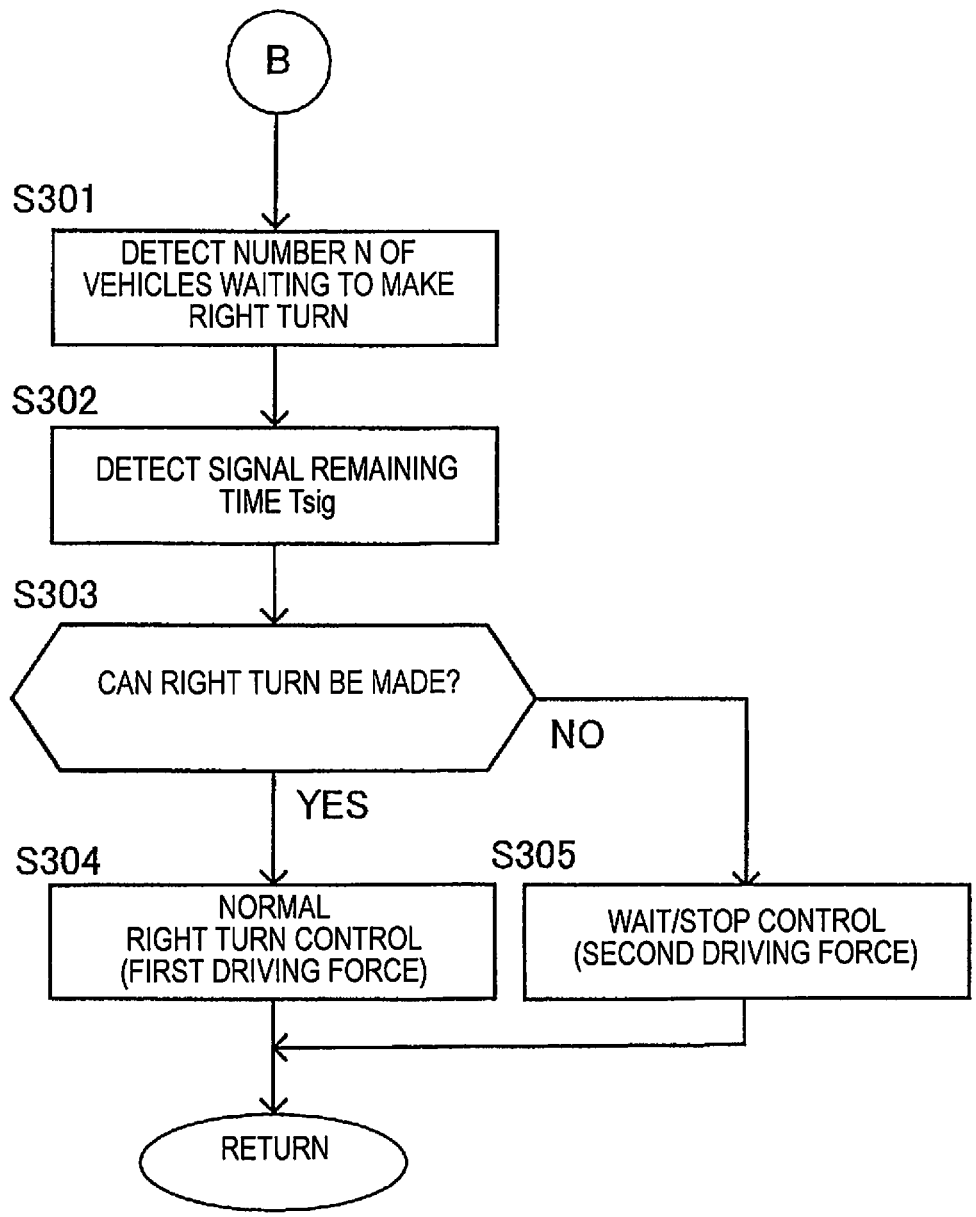
FIG. 5 is a flowchart of specifics of a process during a right turn made while the vehicle no further ahead than third in a row of vehicles, in the right-turn control routine according to the same embodiment.

In the flowchart shown in FIG. 5, in S301, a number N of other vehicles (referred to below as "vehicles waiting to turn right") present between the intersection and the preceding vehicle VPre is detected. The number N of vehicles waiting to turn right can be detected based on, inter alia, image information obtained by the optical camera sensor 16.

In S302, the remaining time (signal remaining time) Tsig during which the traffic signal SIG1 will maintain the current green signal light is assessed.

In S303, whether or not the host vehicle Va can make a right turn is determined. A determination of a case in which the host vehicle Va is no further ahead than the third in the row of vehicles is made by learning determination results from a relationship between the number N of vehicles waiting to turn right and the signal remaining time Tsig. As a learning tendency, it is determined that a right turn can be made when the signal remaining time Tsig is relatively long in relation to the number N of vehicles waiting to turn right, and it is determined that a right turn cannot be made when the signal remaining time Tsig is relatively short. When a right turn can be made, the process advances to S304, and when a right turn cannot be made, the process advances to S305. For this learning, the distance from the intersection to the host vehicle Va may be taken into consideration. For example, learning relying on the number N of vehicles waiting to turn right and the signal remaining time Tsig is corrected such that there is a higher tendency for a determination that a right turn cannot be made when the host vehicle Va is in a position still far from the intersection. When it is not possible to ascertain what place the host vehicle Va is in within the row of vehicles, it is possible to switch to a determination based on the vehicle speed VSPpre of the preceding vehicle VPre instead of a determination based on the number N of vehicles waiting to turn right.

In S304, a right turn is executed during the current green signal light. Specifically, either the current travel state via autonomous driving is maintained or the host vehicle Va is caused to approach the intersection with the first driving force F1 for traveling following the preceding vehicle VPre, and a right turn is executed following the preceding vehicle VPre.

In S305, a right turn at the current green signal light is deferred. Specifically, as in S207, the host vehicle Va is caused to move forward to a start position at the next green signal light with the second driving force F2, i.e., a driving force corresponding to the accelerator pedal not being pressed. The "start position at the next green signal light" when the host vehicle Va is no farther ahead than the third in the row of vehicles is either the position of the stop line before the intersection or a position where a predetermined vehicle-to-vehicle distance is left behind the preceding vehicle VPre which has stopped at or behind the position of the stop line. When the traffic signal SIG1 turns back to green, whether or not the host vehicle Va can make a right turn during the current green signal light is determined based on the traffic situation in the post right-turn lane, the behavior of the preceding vehicle VPre, the number N of vehicles waiting to turn right, etc. When a right turn can be made, the host vehicle Va is caused to approach the intersection with the first driving force F1 corresponding to the target vehicle speed for right turns and a right turn is executed, and when a right turn cannot be made, a right turn is again deferred and either the host vehicle Va is caused to remain stopped at the position of the stop line or the host vehicle Va is caused to creep forward to the position of the stop line that is the start position of the next green signal light or to a position behind the preceding vehicle VPre.

In the present embodiment, a "traffic condition acquisition unit" is configured from the optical camera sensor 16 and the car navigation system 18, a "traffic situation sensing unit" is configured from the radar sensor 17, and a "traveling control unit" is configured from the driving assist system controller 1.

Description Pertaining to Action

Figure 6:
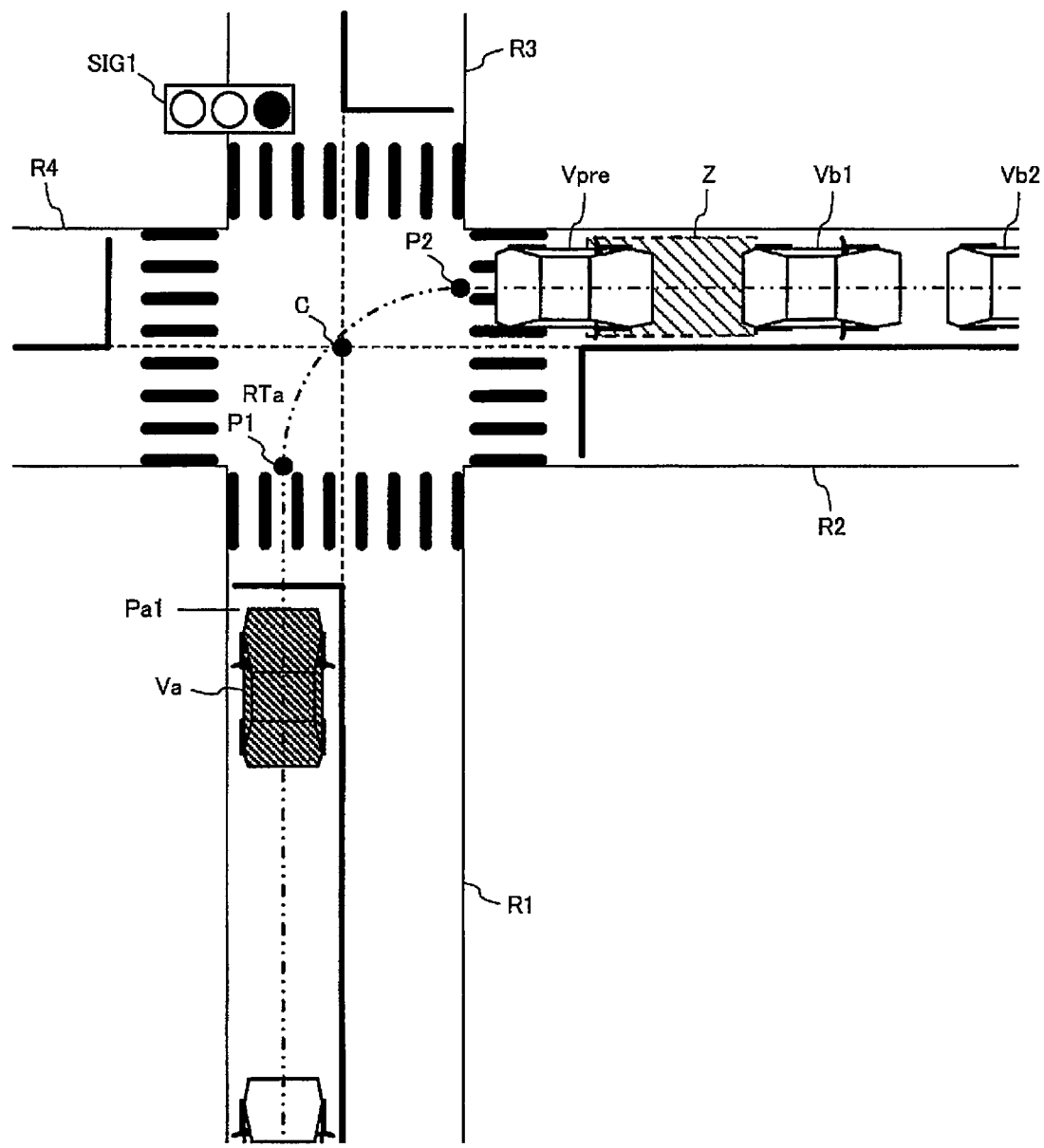
FIG. 6 is an explanatory drawing of one example of an action of an autonomously driven vehicle (when reaching a stop line) according to the same embodiment.
Figure 7:
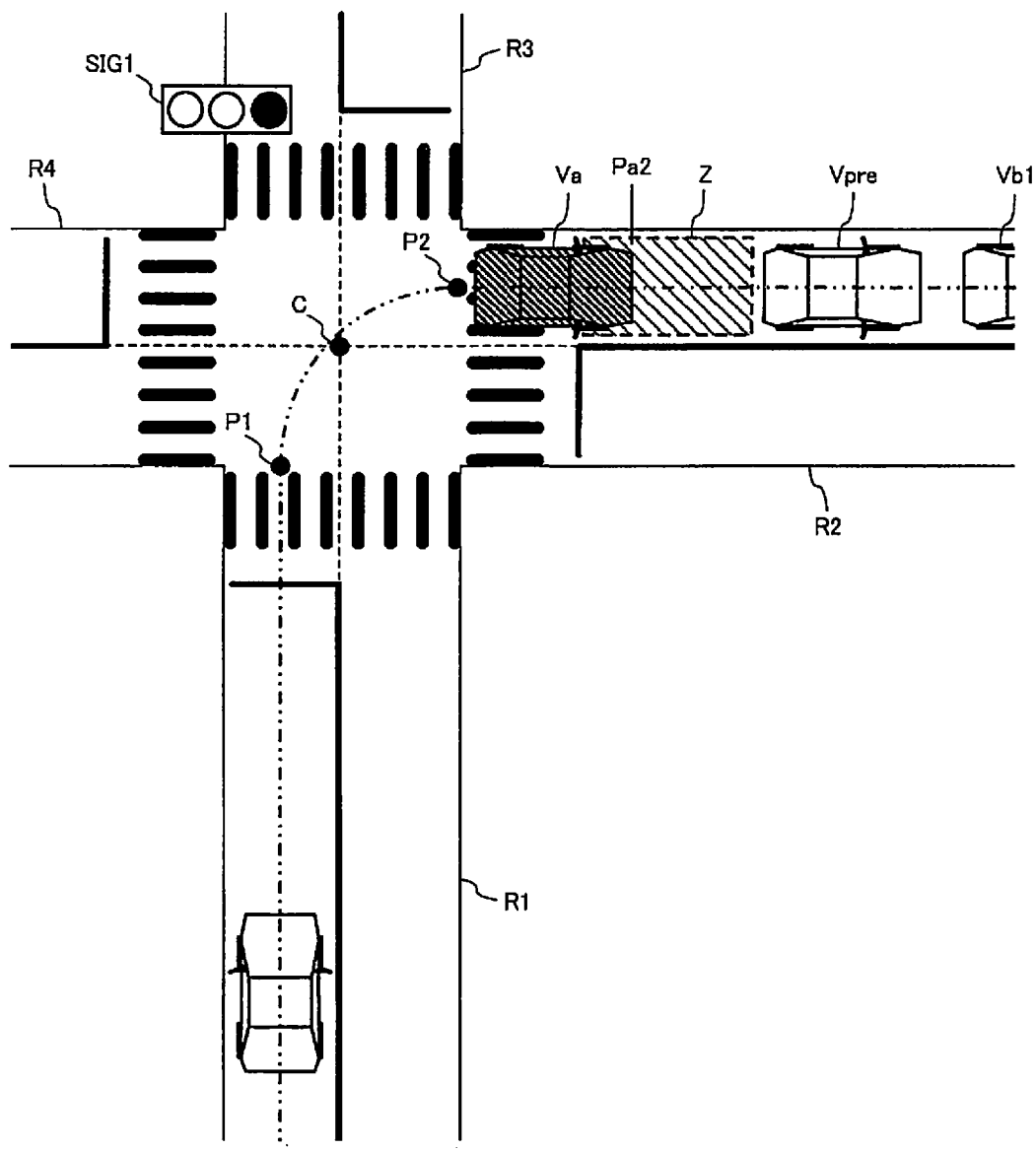
FIG. 7 is an explanatory drawing of one example of an action of an autonomously driven vehicle (when passing through an intersection) according to the same embodiment.

FIGS. 6 and 7 show changes in the situation from the start of the control shown in FIG. 2. FIG. 6 shows a situation at a time point when the host vehicle Va has reached the position of the stop line before the traffic signal SIG1 (stop line reach time) in a case in which there is no advancement space Z for the host vehicle Va in the post right-turn lane, and FIG. 7 shows a situation at a time point when the host vehicle Va has passed through the intersection (intersection pass time) in a case in which an advancement space Z for the host vehicle Va is ensured in the post right-turn lane. Using the time of a right turn when the host vehicle Va is traveling as the second in a row of vehicles in front of the intersection at the start of control as an example, the action of the autonomously driven vehicle according to the present embodiment is further described.

When the host vehicle Va, while traveling along the set route, reaches the position Pa0 in front of the intersection through which the host vehicle Va will turn right, the driving assist system controller 1 starts the right-turn control routine (FIG. 2). When the traffic signal SIG1 in front of the host vehicle Va is green, a determination is made as to whether or not the host vehicle Va can make a right turn through the intersection during the current green signal light. In the present embodiment, a determination of whether or not a right turn can be made in a case in which the host vehicle Va is the second in a row of vehicles is performed based on the behavior of vehicle speed VSPpre of the preceding vehicle VPre, and when the vehicle speed VSPpre is high and the host vehicle Va is able to advance into the intersection following the preceding vehicle VPre while the traffic signal SIG1 maintains the current green signal light, it is determined that a right turn can be made, the host vehicle Va is caused to approach the intersection by the comparatively high first driving force F1, and a right turn is executed after the host vehicle has been appropriately decelerated in advance of the right turn. FIG. 7 shows a situation at a time point when, in the post right-turn lane, an advancement space Z for the host vehicle Va is ensured behind the preceding vehicle VPre which has completed a right turn, and the host vehicle Va has executed a right turn and passed through an exit point P2 of the intersection.

Conversely, when the vehicle speed VSPpre of the preceding vehicle VPre is low and the traffic signal SIG1 changes to yellow or red before the host vehicle Va reaches the intersection, it is determined that a right turn cannot be made, and the host vehicle Va is caused to move forward to the start position at the next green signal light with the second driving force F2, which is lower than the first driving force F1, i.e., a driving force corresponding to the accelerator pedal not being pressed. FIG. 6 shows a situation at a time point in which, in the post right-turn lane, the advancement space Z for the host vehicle Va is occupied by the preceding vehicle VPre which has completed a right turn, it is determined that a right turn cannot be made, and the host vehicle Va has moved forward to the position of the stop line in front of the intersection and has stopped there.

Description of Effects

The control device (vehicle control system S) for the autonomously driven vehicle according to the present embodiment is configured as described above, and the effects achieved by the present embodiment are summarized below.

Firstly, when a right turn through the intersection is made under autonomous driving, a determination is made as to whether or not the host vehicle Va can make a right turn during the current green signal light. When a right turn can be made, the host vehicle Va is made to approach the intersection by the comparatively high first driving force F1 and a right turn is executed, and when a right turn cannot be made, the right turn at the current green signal light is deferred and the host vehicle Va is caused to move forward to the start position at the next green signal light with the second driving force F2, which is lower than the first driving force F1. Due to this configuration, when a right turn can be made, a right turn is quickly executed without hindering traffic smoothness, and when a right turn cannot be made, instances of needless fuel consumption due to unnecessary acceleration can be minimized. Therefore, fuel consumption can be reduced while ensuring traffic safety and smoothness at the intersection.

During the determination of whether or not a right turn can be made, an assessment is made as to whether or not an advancement space Z for the host vehicle Va is ensured in the post right-turn lane, whereby a right turn is executed regardless of there being no advancement space Z, and it is thereby possible avoid situations in which the host vehicle Va stops within the intersection and traffic is adversely affected after the color of the traffic signal SIG1 has changed.

Secondly, when a right turn cannot be made with the second driving force F2 as the driving force corresponding to the accelerator pedal not being pressed, the effect of reducing fuel consumption can be increased as much as possible by causing the host vehicle Va to move forward while the accelerator pedal is not being pressed or while creeping toward the start position at the next green signal light.

Thirdly, the determination of whether or not the host vehicle can make a right turn during the current green signal light is performed based on the behavior of another vehicle (e.g., the vehicle speed VSPpre of the preceding vehicle VPre) in front of the host vehicle Va, the number N of vehicles present between the intersection and the host vehicle Va, the remaining time of illumination of the current green signal light (the signal remaining time Tsig), the distance from the intersection to the host vehicle Va, and the traffic situation in the post right-turn lane, whereby specific indicators are given for carrying out an appropriate assessment of whether or not a right turn can be made.

In the description above, a case of applying the present invention to an autonomously driven vehicle using an engine E as a drive source was described, but the autonomously driven vehicle to which the present invention can be applied may also be an electric vehicle that uses an electric motor or a motor generator as a drive source. In the case of an electric vehicle, moving the host vehicle Va forward when a right turn cannot be made is accomplished by a driving force (second driving force F2) that consumes less power than when a right turn can be made.

Furthermore, a right turn while driving on the left side of the road was described, but the term "right turn" in the present invention also conceptually includes left turns while driving on the right side of the road.

Furthermore, a case of making a right turn through a crossroad was described, but this case is not provided by way of limitation on the term "intersection" to which the present invention can be applied; preferably there are a lane ahead into which the host vehicle Va can turn right (a post right-turn lane) and a traffic signal SIG1 regulating right turning by the host vehicle Va, and another possible example of such an intersection, other than a lane (road R1) where the host vehicle Va is currently present and the post right-turn lane (road R2), is a T road having a lane (road R3) through which the host vehicle Va moves straight into the intersection or a lane (road R4) into which the host vehicle turns left.

An embodiment of the present invention was described above, but the above embodiment merely presents part of an example of application of the present invention, there being no intention to limit the technical range of the present invention to the specific configuration of the above embodiment. Various changes and revisions can be made to the above embodiment within range of the matters set forth in the claims.

The invention claimed is:

1. A control method for autonomously driving a host vehicle, the control method comprising:
   determining whether the host vehicle is currently being autonomously driven;
   determining whether the host vehicle is in a stopped state waiting to make a left turn at an intersection upon determining that the host vehicle is being driven autonomously;
   determining, with a sensor disposed on the vehicle, whether at least one other vehicle is ahead of the host vehicle in a row of vehicles upon determining that the host vehicle is in the stopped state waiting in the row of vehicles to make the left turn at the intersection;
   determining whether or not the host vehicle can make the left turn while a signal light is still green at a time the left turn is to be made, while the host vehicle traveling in a right side of a road is determined to be autonomously driven and waiting in the stopped state in the row of vehicles with the at least one other vehicle ahead of the host vehicle before making the left turn at the intersection;
   and causing the host vehicle to creep forward from the stopped state to a start position in front of the intersection for starting at a next time the signal light is green upon determining the left turn cannot be made.

2. The control method according to claim 1, wherein the determining of whether or not the host vehicle can make the left turn while the signal light is still green at the time is determined based on a behavior of another vehicle ahead of the host vehicle.

3. The control method according to claim 1, wherein the determining of whether or not the host vehicle can make the left turn while the signal light is still green at the time is determined based on a number of other vehicles present between the intersection and the host vehicle.

4. The control method according to claim 1, wherein the determining of whether or not the host vehicle can make the left turn while the signal light is still green at the time is determined based on a remaining time of illumination of the signal light being green.

5. The control method according to claim 1, wherein
the determining of whether or not the host vehicle can make the left turn while the signal light is still green at the time is determined based on a distance from the intersection to the host vehicle.

6. The control method according to claim 1, wherein
the determining of whether or not the host vehicle can make the left turn while the signal light is still green at the time is determined based on a traffic situation in a post left-turn lane.

7. The control method according to claim 1, wherein
the determining of whether the host vehicle can make the left turn while the signal light is still green at the time when an advancement space for the host vehicle is ensured in the post left-turn lane.

8. A control method for autonomously driving a vehicle, the control method comprising:
- determining whether the host vehicle is currently being autonomously driven;
- determining whether the host vehicle is in a stopped state waiting to make a left turn at an intersection upon determining that the host vehicle is being driven autonomously;
- determining, with a sensor disposed on the vehicle, whether at least one other vehicle is ahead of the host vehicle in a row of vehicles upon determining that the host vehicle is in the stopped state waiting in the row of vehicles to make the left turn at the intersection;
- determining whether or not the host vehicle can make the left turn while a signal light is still green at a time the left turn is to be made by the host vehicle traveling in a right side of a road upon determining that the host vehicle is being autonomously driven and waiting in the stopped state in the row of vehicles with the at least one other vehicle ahead of the host vehicle at the intersection;
- causing the host vehicle to approach the intersection with a first driving force and executing the left turn upon determining the left turn can be made; and
- causing the host vehicle to move forward with a second driving force, which is lower than the first driving force, to a start position in front of the intersection for starting at a next green signal light upon determining the turn across the oncoming traffic cannot be made; and
- causing the host vehicle to creep forward from the stopped state to the start position in front of the intersection for starting at a next green signal light with the second driving force upon determining the host vehicle is waiting in the stopped state in the row of vehicles before making the left turn at the intersection and cannot make the left turn while the signal light is still green at a time of the left turn.

9. A control device for autonomously driving a vehicle, the control device comprising:
- a traffic condition acquisition unit configured to acquire a traffic condition of a road on which the host vehicle is traveling, the traffic condition acquisition unit including at least one of a first sensor and a receiver;
- a traffic situation sensing unit configured to sense a traffic situation of another vehicle other than the host vehicle, the traffic situation sensing unit including a second sensor; and
- an electronic controller configured to control a traveling state of the host vehicle based on information from the traffic condition acquisition unit and the traffic situation sensing unit during travel under autonomous driving;
- the electronic controller being configured to
- determine whether the host vehicle is currently being autonomously driven;
- determine whether the host vehicle is in a stopped state waiting to make a left turn at an intersection upon determining that the host vehicle is being autonomously driven;
- determine, with the traffic condition acquisition unit disposed on the vehicle, whether at least one other vehicle is ahead of the host vehicle in a row of vehicles upon determining that the host vehicle is in the stopped state waiting in the row of vehicles to make the left turn at the intersection;
- determine whether or not a host vehicle can make the left turn while a signal light is still green at a time the left turn is to be made while the host vehicle traveling in a right side of the road is determined to be autonomously driven and waiting in the stopped state in the row of vehicles with at least one other vehicle ahead of the host vehicle before making the left turn at an intersection during traveling under autonomous driving; and
- cause the host vehicle to creep forward from the stopped state to a start position in front of the intersection for starting at a next time the signal light is green upon determining the left turn cannot be made.

* * * * *